UNITED STATES PATENT OFFICE.

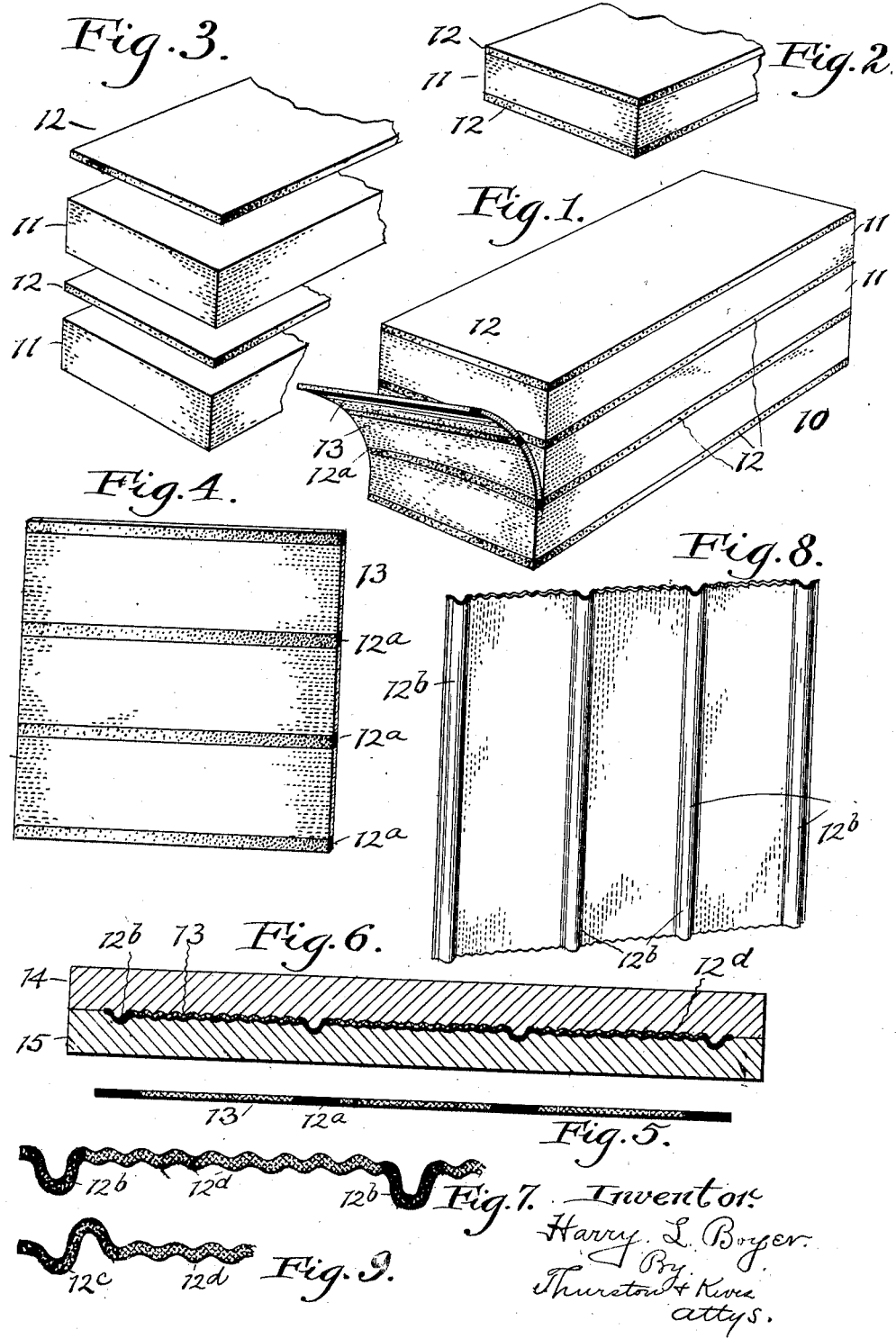

HARRY L. BOYER, OF TRENTON, NEW JERSEY, ASSIGNOR TO JOSEPH STOKES RUBBER COMPANY, OF TRENTON, NEW JERSEY, A CORPORATION OF NEW JERSEY.

STORAGE-BATTERY SEPARATOR AND PROCESS OF PRODUCING THE SAME.

1,357,378.  Specification of Letters Patent.  Patented Nov. 2, 1920.

Application filed February 6, 1919. Serial No. 275,413.

*To all whom it may concern:*

Be it known that I, HARRY L. BOYER, a citizen of the United States, residing at Trenton, in the county of Mercer and State of New Jersey, have invented a certain new and useful Improvement in Storage-Battery Separators and Processes of Producing the Same, of which the following is a full, clear, and exact description.

This invention relates to an improved storage battery separator, and to a process of producing the same, the invention having particular utility in connection with separators having the structural characteristics and made by the processes described and claimed in patents granted to T. A. Willard, October 16, 1917, and numbered 1,243,368 and 1,243,370.

The principal object of the present invention is to reduce the cost of ribbing porous separators, particularly of the Willard type, and to provide such a separator with strong insulating ribs or equivalent spacing projections formed as an integral part thereof, which will serve to effectively space the porous material from the plate or plates and thus prevent deterioration thereof by chemical action.

Still further, the invention aims to provide a porous separator wherein the porosity is formed by threads or fibrous material such as fully described in the Willard patents above mentioned, and with ribs or other projections of rubber or equivalent insulating material such as celluloid formed in such a way as to eliminate the necessity of vulcanizing or cementing separate rib-forming strips to the porous sections.

In carrying out my invention I provide a separator composed of main porous portions separated by insulating strips extending in suitably spaced relation across the separator, and distorted or deformed to form on one or both sides of the separator the spacing members.

In forming this separator with integral insulating non-porous ribs or spacers between the porous portions, and preferably along two sides thereof, I prefer to build up a body of porous material in which is placed at intervals, layers of insulating material, that is to say, the body is preferably built up of alternate slabs of porous and insulating portions, and I then slice this body into the separator sections, each of which is therefore traversed by parallel insulating sections which in the next step of the process are deformed to form the ribs or projections by a molding or molding and vulcanizing operation.

In this manner there is produced a novel form of separator having all the advantages of a separator of the regular type, with additional structural advantages, and the further advantage of a greatly reduced cost of production.

My invention may be further briefly summarized as consisting in certain novel details of construction of the separator, and in novel steps of the improved method of forming the same, which will be described in the specification and set forth in the appended claims.

In the accompanying sheet of drawings I have shown the preferred embodiment of my invention in the article, and the preferred method of producing it, and in the drawings Figure 1 is a block or body from which the porous separator sections are adapted to be cut, and showing a section partly severed from one end of the block; Fig. 2 is a perspective view of a portion of a slab, a number of which are utilized in forming the block of Fig. 1, this view showing one way of providing layers of insulating material from which the ribs or spacers are formed; Fig. 3 is a similar view showing a slightly different method of assembling the slabs and insulating material; Fig. 4 is a perspective view of a separator section sliced from the block of Fig. 1; Fig. 5 is a slightly enlarged sectional view of the same; Fig. 6 is a sectional view through a mold illustrating the manner in which the strips of insulating material in the separator section are deformed or distorted to form the ribs or other spacers; Fig. 7 is an enlarged sectional view through a portion of a completed separator embodying one form of my invention; Fig. 8 is a perspective view of the completed separator shown in Fig. 7; and Fig. 9 is a view similar to Fig. 7, showing a modification.

In forming my improved separator by the preferred method, I produce a block or body 10 from which the separator sections are subsequently cut, and this block I build up of alternate slabs of porous material and layers 12 of insulating material.

The slabs 11 may be formed of any suitable porous or pore producing materials, such as mentioned in the Willard patents previously referred to, with this porous material held together by a suitable binding or cementing material. I prefer to form the slabs of superimposed closely adhering layers of rubber frictioned cloth, or of alternate layers of cloth and rubber, though other porous or fibrous materials than cloth may be utilized, and other insulating binding or cementing agencies such as celluloid may be employed.

The layers 12 of insulating material are preferably formed of plastic sheet rubber in unvulcanized state, though other suitable materials such as plastic celluloid may be utilized. The thickness of these layers will depend on the amount of stock or width of the insulating strips required to form the ribs or other spacing projections in the separator section cut from the block 10.

In forming the block 10 the layers of insulating material 12 may be rolled onto the surfaces of the slabs 11 as illustrated in Fig. 2, or the slabs 11 and layers 12 of insulating material may be alternately assembled and then squeezed together to form the block 10, as illustrated in Fig. 3.

In either event there is produced a solid block of the slabs 11 separated by the layers of insulating material 12, with similar layers 12 covering the top and bottom of the block as illustrated.

The block may be formed of indeterminate length, but preferably of such length as will admit of the convenient forming and handling of the slabs and of the block itself. The cross sectional dimensions of the block are preferably substantially the same as the major dimensions, i. e. height and width, of one separator, though it may be made sufficiently large in cross section to admit of more than one separator being formed from each slice or section subsequently cut from the block. Likewise the number of porous slabs 11 and the number of insulating layers 12 which are arranged at intervals through the block may be varied as circumstances require, the number and spacing depending upon the number and spacing of the ribs or spacers which are to be formed in the completed separator. It will be understood that the porous material of each slab extends lengthwise of the block, as do also the layers 12 of insulating material which extend from one end of the block to the other in parallel planes.

If plastic and uncured rubber is utilized as the cementing agency for the porous material of the slabs 11, and also to form the layers 12 from which the insulating spacers are to be produced, the block is next semi-vulcanized to eliminate the sticky characteristic of the rubber, but not to harden the same. If other plastic material, such as celluloid is utilized instead of rubber, the block would be appropriately treated, if necessary, to harden it to a sufficient extent to allow the block to be sliced into sections.

Next the block 10 is sliced or cut transversely into thin separator sections 13 of thickness depending upon the required thickness of the completed separator, the line of cut being, of course, at right angles to the planes of the porous material and at right angles to the layers 12 of insulating material. This produces flat separator sections such as illustrated in Figs. 4 and 5 with short threads of porous material extending transversely from side to side therethrough, and with strips or sections 12$^a$ of non-porous insulating material extending along two edges and at regular intervals between such two edges.

In the next step of the process the separators are completed by deforming the insulating strips to form the spacers and hardening the separators. This is preferably done by placing the separators between the halves 14 and 15 of a mold, (Fig. 6) with appropriately shaped parts to deform the insulating strips 12$^a$ into whatever shape and form the spacing projections are to assume. This deforming consists preferably in pressing corrugations in the insulating strips 12$^a$ so as to form ribs. Generally these ribs extend outwardly from one side of the separator in the manner illustrated at 12$^b$ in Figs. 6, 7 and 8, or they may project outwardly from both sides substantially as shown at 12$^c$ in Fig. 9. These deformations may be otherwise shaped as by making them in the form of spaced lugs or isolated projections which may extend from one side of the separator, or from both sides, as, for example, by having them extend alternately from one side and then the other. In any event they are adapted to engage the plate or plates of the battery to space one or both the latter from the porous portions. Between the ribs or projections 12$^b$ or 12$^c$ the porous portions may be, and preferably are, slightly corrugated as shown at 12$^d$ to provide circulation spaces or grooves for the electrolyte.

In case rubber is used as a cementing agency between the layers or strands of porous material, and also to form the insulating portions which are deformed as above explained, the mold will be a vulcanizing mold, and the separator will remain therein until it is thoroughly vulcanized, forming a plate which is hard, and giving the requisite mechanical strength to the non-porous or solid rubber ribs or projections. If other materials than rubber are utilized, the separators will remain in the molds until they are hardened by heat treatment, or any other treatment which will harden them or put them in finished state.

This step completes the process which results in a separator such, for example, as illustrated in Fig. 8 or Fig. 9. This separator can be produced much more cheaply than prior separators having ribs formed by separate strips applied to the separator sections, for there is eliminated the rather expensive item of separately handling the strips and of applying them to the face of the separator. Additionally by this method the insulating ribs or projections always are formed at the right place, and as they constitute an integral part of the separator body, there is no danger that they will become loose and fall off the separator. At the same time, the separator has ample mechanical strength to meet the requirements of ordinary usage.

If desired, the sides of the block 10 illustrated in Fig. 1, may be coated or covered with layers of rubber as well as the top and bottom faces of the block. These layers, if applied to the sides of the block will be utilized to provide a finish along the top and bottom edges of the completed separator.

I aim in my claims to cover all modifications which do not involve a departure from the spirit and scope of my invention in its broadest aspects.

Having described my invention, I claim:

1. A separator for storage batteries composed of porous portions separated by spaced insulating strips extending across the separator.

2. A separator for storage batteries composed of porous portions with spaced or separated insulating portions formed integral therewith and deformed to form spacing projections.

3. A separator for storage batteries composed of spaced porous portions wholly separated by non-porous portions formed integral therewith and deformed to form spacing projections.

4. A separator for storage batteries having porous portions and non-porous portions arranged at intervals and joining the porous portions into a continuous sheet, the non-porous portions being corrugated to form laterally projecting ribs.

5. A separator for storage batteries composed of porous portions separated by portions of insulating material, said porous portions being deformed to form circulation grooves, and the insulating portions being deformed to form parts which project laterally beyond the porous portions.

6. A separator for storage batteries comprising main portions rendered porous by closely associated threads extending transversely through the separator, and spaced non-porous portions separating the porous portions and extending in parallel relationship across the separator, said non-porous portions being deformed to form spacing projections.

7. The process of making separators which comprises forming a body of porous and insulating portions, slicing the body into separator sections, and deforming the insulating portions to cause them to project beyond the porous portions.

8. The method of making storage battery separators which comprises forming a body of alternate porous and non-porous insulating portions, slicing the body into sections crosswise of the porous and non-porous sections, and deforming the non-porous portions to form spacing projections.

9. The method of making storage battery separators which comprises building up a body of alternate slabs or layers of porous material and insulating material, cutting the body into sections at right angles to the layers, hardening the sections, and at the same time deforming the insulating portions.

10. The method of making storage battery separators which comprises building up a body of alternate slabs or layers of porous material and insulating material, slicing the body into sections at right angles to the layers, and hardening and deforming the sections so as to form relatively deep grooves in the insulating material and relatively shallow grooves in the porous portions.

In testimony whereof, I hereunto affix my signature.

HARRY L. BOYER.